(12) United States Patent
Nguyen et al.

(10) Patent No.: US 12,337,704 B2
(45) Date of Patent: Jun. 24, 2025

(54) TRACTION CONTROL USING MULTIPLE ACTUATORS

(71) Applicant: Rivian IP Holdings, LLC, Plymouth, MI (US)

(72) Inventors: Hien Nguyen, Tustin, CA (US); Bhuvanesh Sainath, Irvine, CA (US); Shuyang Wang, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 269 days.

(21) Appl. No.: 17/938,361

(22) Filed: Oct. 6, 2022

(65) Prior Publication Data
US 2024/0116367 A1    Apr. 11, 2024

(51) Int. Cl.
*B60L 3/10* (2006.01)
*B60W 10/08* (2006.01)
(Continued)

(52) U.S. Cl.
CPC ............... *B60L 3/106* (2013.01); *B60L 3/102* (2013.01); *B60W 10/08* (2013.01); *B60W 10/184* (2013.01); *B60W 30/02* (2013.01); *B60L 2240/12* (2013.01); *B60L 2240/421* (2013.01); *B60L 2240/423* (2013.01);
(Continued)

(58) Field of Classification Search
CPC ...... B60L 3/106; B60L 3/102; B60L 2240/12; B60L 2240/421; B60L 2240/423; B60L 2240/465; B60W 10/08; B60W 10/184; B60W 30/02; B60W 2520/26; B60W 2710/083; B60W 2720/26
See application file for complete search history.

(56) References Cited

U.S. PATENT DOCUMENTS

| 2012/0130616 | A1* | 5/2012 | Caspari | .......... | B60W 30/18172 |
| | | | | | 701/70 |
| 2017/0183008 | A1* | 6/2017 | Isono | .............. | B60W 30/18172 |

(Continued)

OTHER PUBLICATIONS

"What is Traction Control? Getting a Grip on Wheel Slippage-Fighting Tech" by F. Markus Jul. 7, 2020 (downloaded from https://www.motortrend.com/features/what-is-traction-control/) (Year: 2020).*

(Continued)

*Primary Examiner* — Kito R Robinson
*Assistant Examiner* — Tanya C Sienko
(74) *Attorney, Agent, or Firm* — Foley & Lardner LLP

(57) ABSTRACT

Traction control using multiple actuators is provided. A system can identify a slip for a vehicle wheel based on a difference between a wheel motion and a vehicle motion. The system can determine an amount of torque to apply to the wheel to adjust the slip to satisfy the slip target. The system can distribute a first portion of the torque to apply to the wheel via a first actuator of the plurality of actuators and a second portion of the torque to apply to the wheel via a second actuator of the plurality of actuators. The system can provide commands to cause the first actuator to apply the first portion of the amount of torque and cause the second actuator to apply the second portion of the amount of torque to adjust the slip of the wheel.

20 Claims, 6 Drawing Sheets

(51) Int. Cl.
　　　*B60W 10/184*　　　(2012.01)
　　　*B60W 30/02*　　　(2012.01)
(52) U.S. Cl.
　　　CPC .... *B60L 2240/465* (2013.01); *B60W 2520/26* (2013.01); *B60W 2710/083* (2013.01); *B60W 2720/26* (2013.01)

(56) References Cited

U.S. PATENT DOCUMENTS

2019/0248370 A1* 8/2019 Cunningham .. B60W 30/18018
2023/0159018 A1* 5/2023 Shekhar ............... B60W 30/02
　　　　　　　　　　　　　　　　　　　　　　　701/69

OTHER PUBLICATIONS

"Torque blending and wheel slip control in EVs with in-wheel motors" by R. Castro et al., Vehicle System Dynamics, Jan. 2012 (Year: 2012).*
"Performance Benchmark of Yaw Rate Controllers by Active Front Steering" by K. Miyahara et al., IECON 2019—45th Annual Conference of the IEEE Industrial Electronics Society (vol. 1, 2019, pp. 473-478) (Year: 2019).*
"Energy Management of Series-Parallel Hybrid Electric Vehicle Considering Engine Torque Tracking and Emissions Optimization" by C. Zhu et al., Proceedings of the 2021 5th CAA International Conference on Vehicular Control and Intelligence (CVCI) Oct. 29-31, 2021 (Year: 2021).*

* cited by examiner

TRACTION CONTROL USING MULTIPLE ACTUATORS

INTRODUCTION

Electric vehicles (EVs) can travel over various terrains and in different weather and conditions. Handling of the vehicle can vary based on the terrain, weather or conditions.

SUMMARY

This disclosure is generally directed to controlling the slip of a wheel of a vehicle by distributing torque across multiple actuators (e.g., a brake and a motor) of the vehicle. The technology can use a predictive control model to determine the torque distribution for the actuators. The present disclosure provides a solution that utilizes a model for predictively controlling a slip of a vehicle wheel by maintaining a target amount of torque distributed across multiple actuators that apply the torque to the wheel. For example, the present solution can compare a slip of the wheel to a target slip for the wheel and, based on the comparison, determine an amount of torque to apply to the wheel. The present solution can utilize the model to determine, based on a sensor readings as well as weights and constraints of the actuators, the amount of torque for each of the actuators to apply to the wheel. The present solution can distribute the determined amount of torque across the actuators and provide commands to cause each of the actuators to apply their determined portion of the torque to the wheel. In doing so, the present solution can adjust the slip of the wheel in accordance with the slip target and thereby improve the grip and the traction of the wheel with respect to the terrain over which the vehicle is travelling.

At least one aspect is directed to a system. The one or more processors can identify, via a sensor of a vehicle, a slip for a wheel of the vehicle based on a difference between a motion of the wheel and a motion of the vehicle. The one or more processors can determine, based on a comparison between the slip and a slip target for the wheel, an amount of torque to apply to the wheel to adjust the slip of the wheel to satisfy the slip target. The one or more processors can distribute a first portion of the amount of torque to apply to the wheel via a first actuator of the plurality of actuators, and a second portion of the amount of torque to apply to the wheel via a second actuator of the plurality of actuators. The one or more processors can provide one or more commands to cause the first actuator to apply the first portion of the amount of torque and cause the second actuator to apply the second portion of the amount of torque to adjust the slip of the wheel.

At least one aspect is directed to a method. The method can include identifying, by a data processing system of a vehicle comprising one or more processors and memory, via a sensor, a slip for a wheel of the vehicle based on a difference between a motion of the wheel and a motion of the vehicle. The method can include determining, by the data processing system based on a comparison between the slip and a slip target for the wheel, an amount of torque to apply to the wheel to adjust the slip of the wheel to satisfy the slip target. The method can include distributing, by the data processing system based at least in part on a model established with constraints and weights for a plurality of actuators of the vehicle, a first portion of the amount of torque to apply to the wheel via a first actuator of the plurality of actuators. The method can include distributing a second portion of the amount of torque to apply to the wheel via a second actuator of the plurality of actuators. The model can include a first constraint and a first weight for the first actuator that is different than a second constraint and a second weight for the second actuator. The method can include providing, by the data processing system, one or more commands to cause the first actuator to apply the first portion of the amount of torque and cause the second actuator to apply the second portion of the amount of torque to adjust the slip of the wheel.

At least one aspect is directed to an electric vehicle. The electric vehicle can include a plurality of wheels, an electric motor to control rotation of a wheel of the plurality of wheels. The electric vehicle can include a brake to inhibit rotation of the wheel and a first sensor of a plurality of sensors to detect motion of the wheel. The electric vehicle can include a second sensor of the plurality of sensors to detect motion of the electric vehicle. The electric vehicle can include a data processing system that can include one or more processors coupled with memory. The one or more processors can identify, via the plurality of sensors, a slip for the wheel based on a difference between the motion of the wheel and the motion of the electric vehicle. The one or more processors can determine, based on a comparison between the slip and a slip target for the wheel, an amount of torque to apply to the wheel to adjust the slip of the wheel to satisfy the slip target. The one or more processors can distribute, based at least in part on a model established with constraints and weights for the electric motor and the brake, a first portion of the amount of torque to apply to the wheel via the electric motor. The one or more processors can distribute a second portion of the amount of torque to apply to the wheel via the brake. The model can include a first constraint and a first weight for the electric motor that is different than a second constraint and a second weight for the brake. The one or more processors can provide one or more commands to cause the electric motor to apply the first portion of the amount of torque and cause the brake to apply the second portion of the amount of torque to adjust the slip of the wheel.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
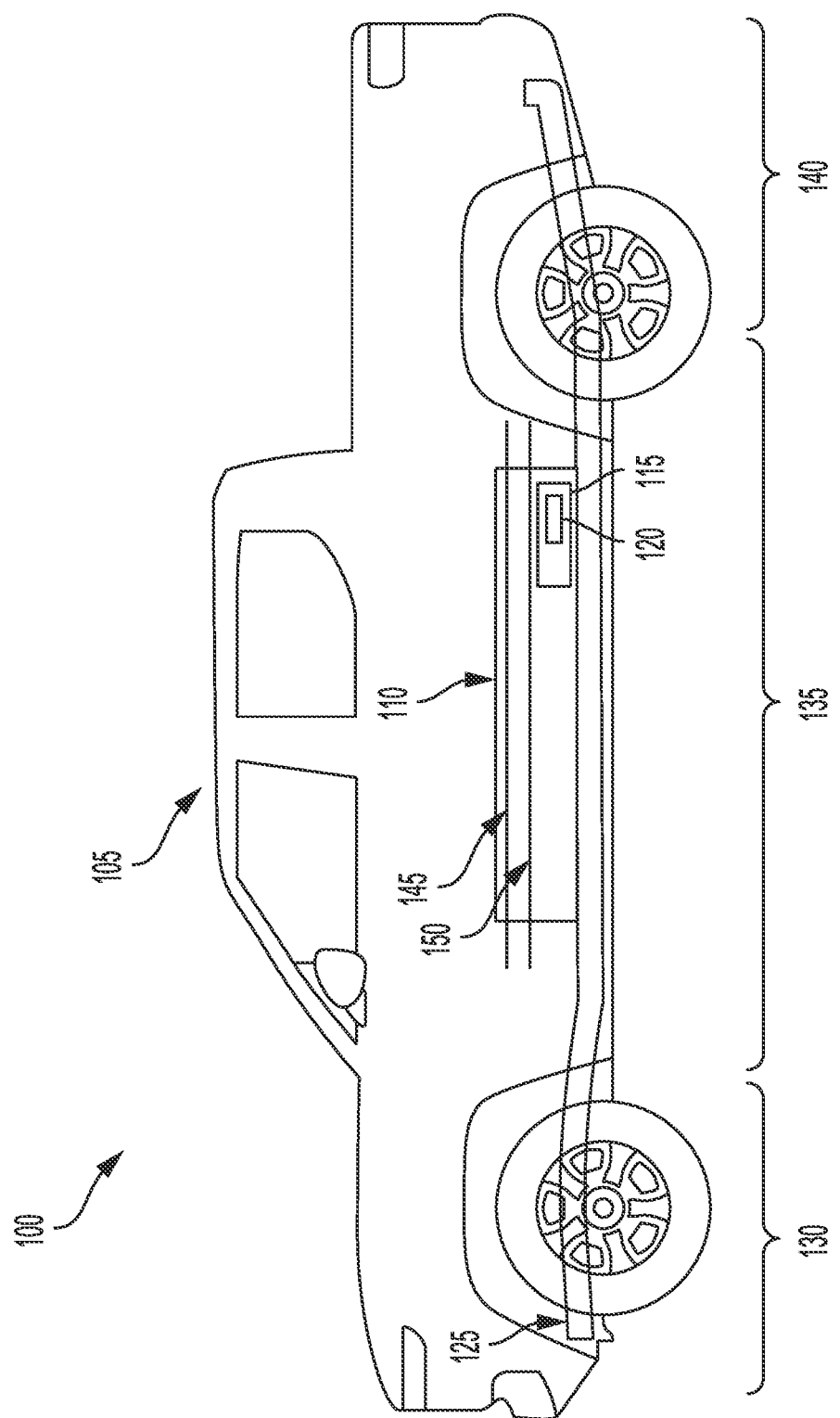
FIG. 1 depicts an example electric vehicle.

Following below are more detailed descriptions of various concepts related to, and implementations of, methods, apparatuses, and systems of controlling the vehicle tire slip using predictive control modeling. The various concepts introduced above and discussed in greater detail below may be implemented in any of numerous ways.

This disclosure is generally directed to a solution for using a predictive control modeling to control a slip of a wheel of a vehicle by distributing the torque across multiple actuators (e.g., brakes and a motor) that apply to torque to the wheel. The present solution can use a model to determine the torque distribution for various actuators that apply the torque to the wheel. The model can assign torque targets to the actuators based on a sensor feedback as well as the weights and constraints for each of the actuators. The model can utilize a quadratic function to identify a global minimum value for a slip of the wheel, based on the weights, constraints and the data. Utilizing the model output, the present solution can leverage the torque distribution across the actuators to control the slip and improve the traction between the wheel and the terrain on which the vehicles travels.

In an illustrative example, a slip of a wheel can occur when a torque applied to a wheel (e.g., tire) of a vehicle exceeds the traction available to the tire. The mismatch between the torque applied and the traction of the wheel can result in the wheel (e.g., the tire) slipping or spinning with respect to the terrain on which the vehicle is moving. Depending on the direction of the torque applied with respect to the traction, the slip can be positive or negative, potentially causing the tire to spin or skid on the terrain. Therefore, when slip is increased the traction between the wheel and the terrain can deteriorate, which can be more pronounced in weather conditions, such as rain, sleet, ice or snow.

The present solution utilizes predictive control modeling to control the slip of a wheel by distributing a target amount of torque across the actuators applying the torque to each wheel. The solution can compare a slip of the wheel to a target slip for the wheel, and based on the comparison, determine an amount of torque to apply to the wheel. The solution can utilize the model to determine, based on feedback from multiple actuators that are configured to provide torque to a wheel, weights and constraints of the actuators, the amount of torque to be applied the wheel by the actuators. The solution can distribute the determined amount of torque across multiple actuators and provide one or more commands causing each of the actuators of the plurality of actuators to apply their determined portion of the torque to the wheel, thereby adjusting the slip in accordance with the slip target and providing the vehicle traction and stability. By distributing or balancing torque across multiple actuators to control slip for a wheel, this technology can provide traction control in an efficient and reliable manner while reducing utilization, power consumption, or wear on one or more of the actuators.

FIG. 1 depicts an example cross-sectional view 100 of an electric vehicle 105 installed with at least one battery pack 110. Electric vehicles 105, also referred to as EV 105, can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. EVs 105 can include gasoline or diesel engine vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
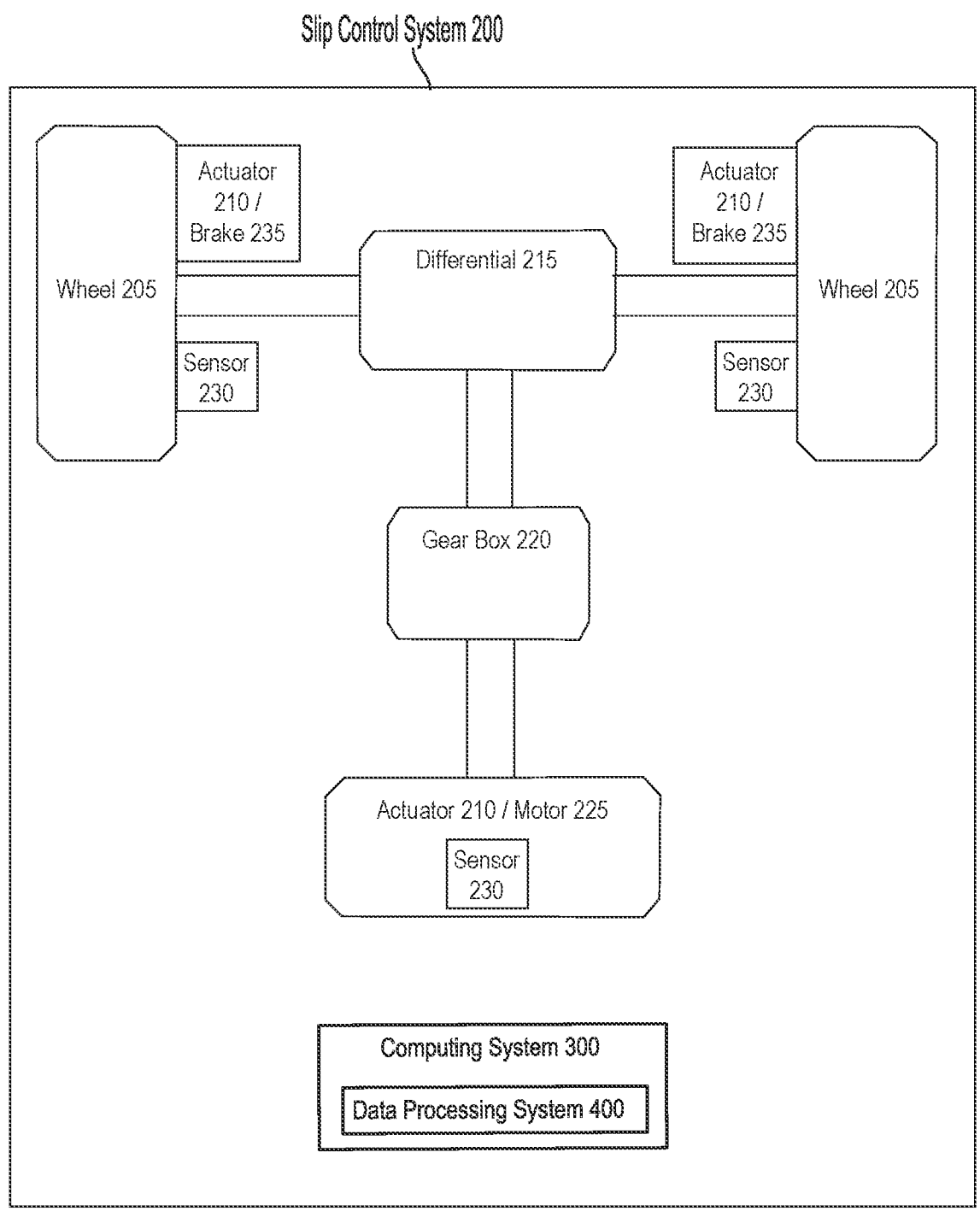
FIG. 2 depicts an example slip control system of the electric vehicle.

FIG. 2 depicts an example of a slip control system 200 of the present solution. The slip control system 200 can include one or more wheels 205. For example, slip control system 200 can include a wheel 205, a pair of wheels 205, three wheels 205, four wheels 205, six wheels 205, eight wheels 205 or any other number of wheels 205. Each wheel 205 can include a drive wheel of an EV 105 having tires for gripping the road. Each wheel 205 can be connected to, in communication with, or coupled with an actuator 210 and one or more sensors 230. Sensor 230 can measure current physical properties, performance or state of the wheel 205, actuator(s) 210 or the EV 105. Actuator 210 can include a brake 235, such as a brake of a wheel 205 of an EV 105 for stopping the EV 105 when a brake pedal is pressed by a driver, or by a component of the data processing system 400 in the case of autonomous driving. Wheels 205 can be connected to, in communication with, or coupled with, a differential 215. Differential 215 can be further connected to, in communication with, or coupled with, a gear box 220. Gear box 220 can be connected to, in communication with, or coupled with a motor 225 of the EV 105, which can act as another actuator 210. The slip control system 200 can include a computing system 300 that can include, execute, or run a data processing system 400 for implementing a predictive control model functionality for distributing the torque across the plurality of actuators 210 of the wheels 205. The data processing system 400 can control the slip and provide traction between the wheels 205 (e.g., tires) and the road on which the EV 105 is driven in an efficient manner.

Wheel 205 can include any drive wheel of an EV 105 that can transmit force and transform torque applied to the wheel 205 into tractive force. Wheel 205 can include a tire mounted thereof for gripping the terrain on which the EV 105 is driven. Wheel 205 can any size and type of a wheel 205, such as a wheel 205 for a sedan vehicle, a truck, a bus, a motorcycle, a moped, a scooter, an airplane, a trailer or any other vehicle that utilizes a wheel 205 for moving over a terrain (e.g., road). Wheel 205 can include mechanical interface for a coupling to mechanically integrate or communicate with a differential 215. Wheel 205 can include interfaces or couplings for connecting or coupling with actuators 210, such as wheel brakes 235 or the EV motor 225.

Actuator 210 can include any device that can control, provide or facilitate movement, or apply torque for moving of, a wheel 205. Actuator 210 can include a brake 235, such as a brake for stopping the movement of a wheel 205 of an EV 105 when a driver presses a brake pedal in an EV 105. Actuator 210 can include a motor 225, such an electric, gasoline or diesel motor that provides torque for moving the wheels 205 via drivetrain (e.g., differential 215, gear box 220, shafts) of the vehicle. Actuator 210 can include any device, component or a system that can affect the movement or spinning of a wheel 205, either by accelerating or decelerating the wheel 205.

Actuator 210 can include a brake 235, which can be system or a device that inhibits motion or stops the movement of a wheel 205. Brake 235 can include a mechanical or an electromechanical device that can stop the movement of the wheel 205 by applying force or friction on a portion or a part of a wheel 205. Brake 235 can include a brake pad, a brake disk or a combination of a brake pad and a brake disk. Brake 235 can be in a physical or a mechanical attachment or coupling with a wheel 205 or a drivetrain of the EV 105. Brake 235, acting as an actuator 210, can include a set of constraints, such as constraints 460 providing limits to the ability to actuate the wheels 205. For example, constraints 460 of the brake 235 can include the limitations of the brake 235 to provide breaking power to a wheel 205. For example, brake 235 of the EV 105 can act as the actuator 210 decreasing the speed at which a wheel 205 spins within the constraints 460 of the brake 235.

Differential 215 can include any component, a system or a mechanical device that allows the drive wheels to turn at different speeds. Slip control system 200 can include multiple differentials 215, such as two differentials 215, three differentials 215, four differentials 215 or any other number of differentials 215. Differential 215 can include a gear train that includes multiple shafts. For example, a differential can include three shafts transferring power or torque between each other to couple the torque from the motor 225 to the wheels 205. Differential 215 can provide for rotational speed of one shaft to be average of the speeds of the other two shafts, or a fixed multiple of that average. Differential 215 can provide wheels 205 with a mechanical communication or coupling with a gear box 220 and further with the motor 225.

Gear box 220 can include any mechanical component of the drivetrain for changing the speed of the wheels 205. Gear box 220 can include multiple gears in the forward direction and in the reverse direction. Gear box 220 can include any number of gears which can interact with each other and with the shaft to mechanically communicating or couple the torque from the motor 225, via the differential 215 and further with the wheels 205. Slip control system 200 can include any number of gear boxes 220.

A second actuator 210 can include the motor 225. Motor 225 can include any system or a machine that can supply motive power for an EV 105. Motor 225 can include an electric motor, a gasoline motor, a diesel motor, or any other motor or a device for providing mechanical force for moving wheels 205 of an EV 105. Motor 225 can be mechanically coupled with and transfer the torque to, the wheels 205. For example, motor 225 can provide mechanical power to the wheels 205 through various shafts and axles, via the gear box 220 and the differential 215. For example, a motor 225 can increase the speed of the wheels 205 or decrease the speed of the wheels 205. Motor 225 can apply a positive or a negative torque to the wheels 205. Slip control system 200 can include any number of same or a different types of motors 225, such as electric motors, diesel motors, gasoline motors or any other types of motors 225.

Motor 225, acting as an actuator 210, can include a set of constraints, such as constraints 460 providing limits to the ability to actuate the wheels 205. For example, constraints 460 of the motor 225 can include the limitations of the motor 225 to provide breaking power to a wheel 205. For example, motor 225 of the EV 105 can act as the actuator 210 increasing or decreasing the speed at which the wheels 205 spin within the constraints 460 of the motor 225.

Sensor 230 can include any sensor or detector for measuring performance of an actuator 210, wheel 205 or EV 105. Sensor 230 can include a speed sensor for measuring speed of a wheel 205, an EV 105, or any part of an EV 105. Sensor 230 can include a torque or a force sensor for measuring torque provided by an actuator 210 to the wheel 205. Sensor 230 can include a vibration sensor, a pressure sensor, a temperature sensor, an accelerometer, a velocity sensor, a stress sensor, a motion sensor, a speed sensor, such as a wheel speed sensor or a vehicle speed sensor, a brake sensor for measuring brake 235 performance or operation or a motor sensor for measuring motor 225 performance or operation. Sensor 230 can include a power sensor for measuring power applied to a wheel 205, EV 105 or any part of an EV 105. Sensor 230 can include a sensor, detector or a system for measuring slip of a wheel 205. For example, sensor 230 can measure the difference between the speed, velocity or motion of a wheel 205 and the speed, velocity or motion of an EV 105.

Computing system 300, also referred to as a computer system 300, can include any combination of electrical and electronic devices for processing digital information or data. Computer system can include any electronic components, devices or systems for implementing a data processing system 400 that can provide the predictive control of the slip of the wheels 205 using one or more controller and modeling functions.

Figure 3:
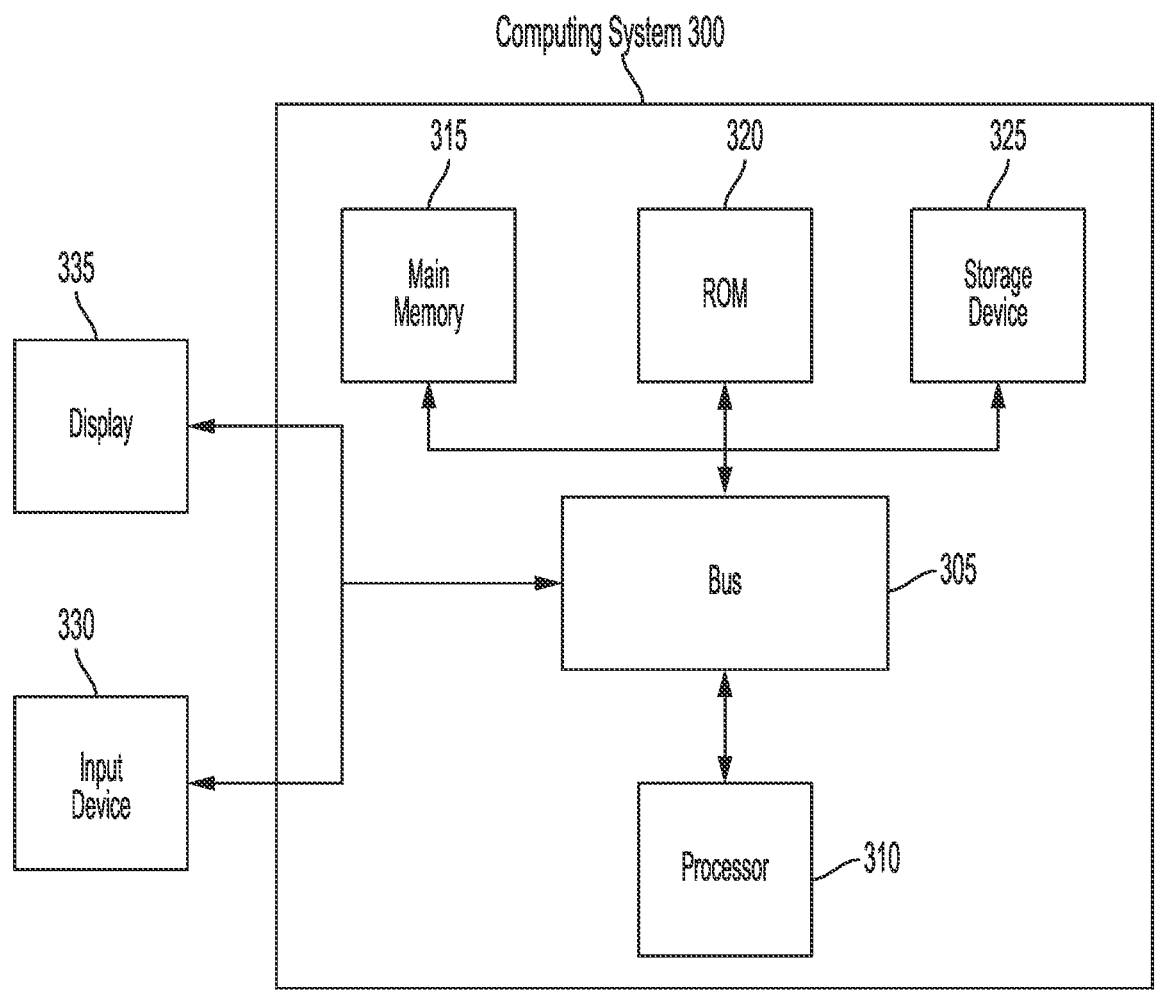
FIG. 3 is a block diagram of an example computer system that can be used to implement a data processing system and the model of the present solution.

FIG. 3 depicts an example block diagram of an example computer system 300. The computer system or computing device 300 can include or be used to implement a data processing system or its components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
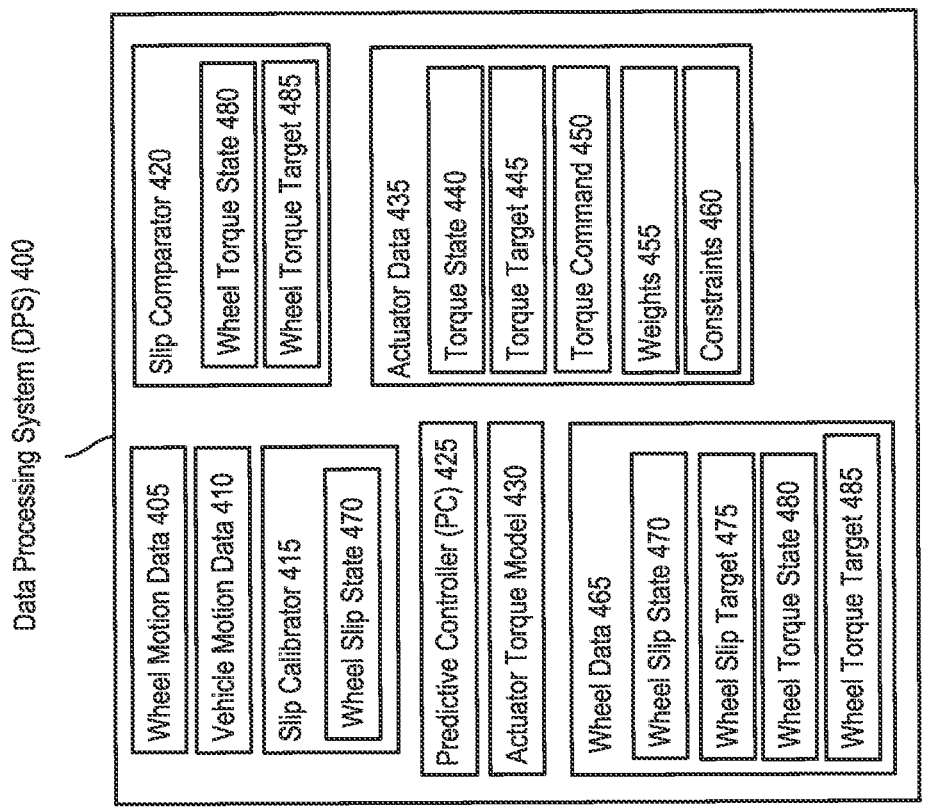
FIG. 4 is a block diagram of an example data processing system for implementing the functions of the slip control for the electric vehicle.

FIG. 4 depicts a data processing system (DPS) 400 of a slip control system 200. DPS 400 can include one or more wheel motion data 405, vehicle motion data 410, actuator data 435 and wheel data 465. DPS 400 can also include one or more slip calibrators 415, slip comparators 420, predictive controllers 425 and actuator torque models 430. Slip calibrator 415 can use or include one or more wheel slip states 470. Wheel data 465 can include one or more wheel slip states 470, wheel slip targets 475, wheel torque states 480 and wheel torque targets 485. Slip comparator 420 can use or include one or more wheel torque states 480 and wheel torque targets 485. Actuator data 435 can include one or more torque states 440, torque targets 445, torque commands 450, weights 455 and constraints 460.

DPS 400 can be implemented in a computing system 300, including for example in one or more processors 310 and based on instructions or computer code that can be stored in the memory of the computer system 300, such as main memory 315, ROM 320 or storage device 325. DPS 400 can use a predictive controller (PC) 425 that can compute or predict the distribution of actuator torque commands 450 to meet the wheel torque target 485. The wheel torque target 485 can be computed by the slip comparator 420. The slip comparator 420 can be a feedforward and a feedback proportional integral (PI) controller in which the wheel slip error can be the feedback.

DPS 400 can utilize the PC 425 along with the actuator torque model 430 to determine the torque setting (e.g., the torque target 445) for each of the actuators 210 (e.g., brakes 235 or motor 225). The wheel torque target 485 can be determined based on a wheel slip target 475 and the current wheel slip state 470 which can be received from the slip calibrator 415. The torque targets 445 for the actuators 210 can be determined by the actuator torque model 430 based on a cost function that utilizes weights 455 and constraints 460 for each of the actuators 210 to determine the most desirable distribution of the torque across the actuators 210. Data processing system 400 can issue torque commands 450 to the actuators 210 (e.g., brakes 235 or the motor 225) for each individual wheel 205 to apply the determined specific torque targets 445 to each individual wheel 205. DPS 400 can determine and implement the distribution of the torque across the actuators 210 for each individual wheel 205 and control the slip of each wheel to maintain the wheel slip state 470 within the wheel slip target 475 and thereby improve the traction of the wheels 205 on the terrain. By distributing or balancing wheel torque target 485 value of the total torque for the wheel 205 across multiple actuators 210 to control slip for the wheel 205, DPS 400 can provide traction control in an efficient and reliable manner while reducing utilization, power consumption, or wear on one or more of the actuators 210.

Wheel motion data 405 can include any data or information on the motion of a wheel 205. For example, wheel motion data 405 can include the speed or velocity of a wheel 205, acceleration of a wheel 205 or deceleration of a wheel 205. Wheel motion data 405 can include data on vibration, pressure, temperature or any other data from a sensor 230. Wheel motion data 405 can be stored in tables, files or data structures to be accessible by the data processing system 400 or the predictive controller 425. Wheel motion data 405 can include data compiled and stored individually for each individual wheel 205 of the plurality of wheels 205 of an EV 105.

Vehicle motion data 410 can include any data or information on the motion of an EV 105. For example, vehicle motion data 410 can include the speed or velocity, acceleration or deceleration of an EV 105 or any of its wheels 205. Vehicle motion data 410 can include data on vibration, pressure, temperature or any other data from a sensor 230. Vehicle motion data 410 can be stored in tables, files or data structures to be accessible by the data processing system 400 or the predictive controller 425. Vehicle motion data 410 can include data compiled and stored individually for the EV 105 or any of its individual wheels 205.

Slip calibrator 415 can include any combination of hardware and software for monitoring the current wheel slip state 470 of the wheels and determining wheel slip target 475. Slip calibrator 415 can include scripts, functions and computer code stored in memory and executed or operating on one or more processors to monitor and detect the slip of each of the wheels 205 or determining the wheel slip target 475. Slip calibrator 415 can increase the wheel slip target 475 when the terrain and conditions are not ideal. For example, when EV 105 is driving over a snow, sleet or rain the wheel slip target 475 can be set to a higher value than when EV 105 is driving on a dry and clear road. Slip calibrator 415 can utilize information from sensors 230 to detect and keep track of slip of each of the wheels 205 (e.g., wheel slip state 470) in real time. For example, slip calibrator 415 can continuously monitor and maintain data on the slip of each individual wheel 205. Slip calibrator 415 can determine the wheel slip state 470 for each individual wheel 205. For example, slip calibrator 415 can monitor the slip of each of the wheels 205 and store and keep the track for each wheel 205.

Slip comparator 420 can include any combination of hardware and software for comparing a current state of a slip of a wheel 205 (e.g., wheel slip state 470) with a wheel slip target 475. Slip comparator 420 can determine the amount of torque to be applied to each individual wheel 205 (e.g., wheel torque state 480). For example, slip comparator 420 can compare a current wheel slip state 470 with a wheel slip target 475 for a given wheel 205 and determine the present state of torque (e.g., wheel torque state 480) for that wheel 205. The PC 425 can then use the wheel torque state 480 determined by the slip comparator 420 to determine the wheel torque target 485 and the torque targets 445 for each of the individual actuators 210. For instance, slip comparator 420 can determine the present wheel torque state 480 for each individual wheel 205, via a comparison between the wheel slip state 470 and a wheel slip target 475 of each wheel 205, and pass the wheel torque state 480 to the PC 425. The PC 425 can then update the torque targets 445 for the actuators 210 of each of the wheels 205 based on the received wheel torque state 480. Slip comparator 420 can include scripts, functions and computer code stored in memory and executed or operating on one or more processors to compare the wheel slip state 470 with the wheel slip target 475 for each individual wheel 205. Slip comparator 420 can continuously compare each reading of a wheel slip state 470 with a wheel slip target 475 in real time. For example, slip comparator 420 can receive a current reading of the wheel slip state 470 and compare it with the wheel slip target 475.

Predictive controller (PC) 425 can include any combination of hardware and software for determining the torque to be applied by each individual actuators 210 to each wheel 205. PC 425 can include any functionality for determining or predicting the next setting (e.g., torque target 445) or command (e.g., torque command 450) for each individual actuator 210 to apply to a wheel 205. Predictive controller 425 can include scripts, functions and computer code stored in memory and executed or operating on one or more processors to determine the next torque target 445 and torque command 450 in accordance with weights 455 and constraints 460 of the individual actuators 210. PC 425 can continuously determine the torque target 445 and torque commands 450 for the actuators 210 based the amount of torque applied to each wheel 205. PC 425 can determine the torque targets 445 and torque commands 450 based on wheel slip state 470 determined by slip calibrator 415 and wheel torque state 480 determined by the slip comparator 420. For example, PC 425 can receive a current reading of the wheel slip state 470 from the slip calibrator 415 and compare it with the wheel slip target 475 to determine the next wheel torque target 485. The PC 425 can use the next wheel torque target 485 to determine the next torque target 445 for each individual actuator 210.

Actuator torque model 430 can include any combination of hardware and software for modeling the torque for a wheel 205 or determining torque to be distributed to each actuator 210. Slip calibrator 415 can include scripts, functions and computer code stored in memory and executed or operating on one or more processors to model the torque for the wheels 205 or determine torque target 445 for each actuator 210 to be applied to a wheel 205. Actuator torque model 430 can be determined using linear dynamics of actuators 210.

Actuator torque model 430 can utilize or include a mathematical function to determine a global minimum value for distributing torque across actuators 210 and adjusting the slip of the wheel 205 in accordance with the wheel slip target 475. Actuator torque model 430 can include a mathematical function that describes the relationship between the commanded torque (e.g., wheel torque target 485 as expressed by torque commands 450) and the output torque (e.g., torque state 440) of the actuator 210. Actuator torque model 430 can use polynomial functions. For example, a cost function can use the actuator torque model 430 to form, establish or provide or formulate itself into a quadratic function. The quadratic function can have a global minimum value which can correspond to the optimal torque distribution. For example, a cost function of the actuator torque model 430 can identify a global minimum value for a wheel slip target 475 in view of actuator data 435 and wheel data 465. For example, a quadratic function of the cost function can be expressed with a three dimensional graph in which a global minimum value corresponds to the setting of torque targets 445 for a plurality of actuators 210 of a wheel 205. For example, the global minimum value can correspond to the optimal torque settings (e.g., wheel torque target 485) for a wheel 205 and/or the torque target 445 settings for the actuator 210 (e.g., motor 225 or brakes 235) of the wheel 205, based on the weights 455 and constraints 460. The global minimum can be determined based on the constraints 460 and weights 455 for the actuators 210 for each wheel.

Actuator torque model 430 can include and utilize one or more machine learning (ML) or artificial intelligence (AI) functions. Actuator torque model 430 can include a ML functionality model trainer having any combination of hardware and software, including scripts, functions and computer code stored in memory or operating on a processor for determining torque targets 445 for actuators 210 or wheel torque targets 485 for wheels 205. Actuator torque model 430 can include an ML model trainer to train determining of wheel torque state 480 or torque targets 445 for actuators 210. Actuator torque model 430 can include an ML model trainer to train determining wheel torque target 485 using any one or more of a wheel torque state 480, wheel slip state 470 and wheel slip target 475 as input. Actuator torque model 430 can include a ML model trainer to train determining torque target 445 using one or more of a wheel torque target 485, torque state 440, weights 455 and constraints 460 as inputs.

Actuator data 435 can include any data on an actuator 210. Actuator data 435 can include current data on a current state of an actuator 210, such as any brake 235 or motor 225. Actuator data 435 can include a torque state of an actuator 210 or weights 455 or constraints 460 of the actuator 210. Actuator data 435 can include settings for an actuator 210, such as torque target 445. Actuator data 435 can include data stored in a storage device 325, such as for example a database of a storage device 325.

Torque state 440 can include any data or information on the current state of a torque for an actuator 210. Torque state 440 can include data identifying the amount of torque currently applied by an actuator 210, such as a motor 225 or brake 235. Torque state 440 can include information on the current setting or a status of an actuator 210. Torque state 440 can include readings or data from sensors 230, such as sensors 230 measuring performance (e.g., torque, force, power, speed or friction) of actuators 210.

Torque target 445 can include any data or information on the next state of torque for an actuator 210. Torque target 445 can include a next setting for an actuator 210, such as an adjustment to the amount of torque that actuator 210 is to apply to the wheel 205. For example, torque target 445 can include a next torque or friction setting for a brake 235. For example, torque target 445 can include a next torque setting for a motor 225, such as a setting corresponding to an acceleration or deceleration amount. For example, torque target 445 can include a setting or an amount of force or power to be applied by an actuator 210, such as a motor 225 or brake 235.

Torque command 450 can include any command for setting or applying a torque by an actuator 210. Torque command 450 can include a command or instruction for a brake 235. Torque command 450 can include a command or instruction for a motor 225. For example, a torque command 450 can include the amount of power or torque to be applied by motor 225. For example, a torque command 450 can include a setting for a brake 235 for a particular amount of friction to be applied to a brake pad of a wheel 205. Torque command 450 can include or be based on a torque target 445 for an actuator 210.

Weights 455 can include any parameter, setting or a value for an actuator 210. Weight 455 can indicate the strength assigned to a particular actuator 210 in determining the torque targets 445 or torque commands 450. Weight 455 can indicate or correspond to a preference of the actuator 210 to be used for distributing torque to a wheel 205. For example, a weight 455 of a motor 225 can be greater than the weight of brake 235. When weight 455 of a motor is greater than the weight of a brake 235, the motor 225 can receive an increased amount of torque target 445 to apply to the wheel, leaving the remaining amount of torque (e.g., torque target 445 for a brake of the same wheel 205) to be decreased. Weight 455 can include a setting or a value for scaling an amount of torque for a particular actuator 210 (e.g., a motor 225 or a brake 235). Weights 455 can be set or assigned to motor 225 and brakes 235 by the predictive controller 425. Weights 455 can be assigned to actuators 210 based on their rates of actuation, such as a how fast or slow the actuator 210 can actuate. Weights 455 can be assigned to actuators 210 based on the type of actuation, such as whether the actuation involves acceleration or deceleration.

Constraints 460 can include any parameter indicating a limitation or a constraint for an actuator 210. Constraint 460 can include a limit for an amount of torque for a particular actuator 210. For example, constraint 460 can include an upper or a lower bound for torque to be applied by brake 235. For example, constraint 460 can include an upper or a lower bound for a torque to be applied by a motor 225. For example, constraint 460 can include a limit to an amount of acceleration or deceleration a motor 225 can provide, or an amount of friction that a brake 235 can provide to a wheel 205. Constraints 460 can be assigned to an actuator 210 based on the type of actuation it can provide, such as acceleration or deceleration. For example, motor 225 can accelerate the EV 105, whereas brake 235 may not be able to. Constraints 460 can be assigned to an actuator 210 based on the cost of actuation. For example, it may be more beneficial to not use brakes 235 for braking, but rather use the motor 225, or vice versa.

Wheel data 465 can include any data on a wheel 205. Wheel data 465 can include data on a present status of a wheel 205 or settings for the wheel 205. Wheel data 465 can include the wheel slip data, such as the wheel slip state 470 from the slip calibrator 415, or wheel torque state 480 from the slip comparator 420. Wheel data 465 can include wheel slip target 475 to be set or achieved for a wheel 205. Wheel data 465 can include a wheel torque target 485 to be set or achieved for the wheel 205.

Wheel slip state 470 can include any information or data for a current state of slip on a particular wheel 205. For example, wheel slip state 470 can include data, value or parameter indicating a current slip at any one of a front left wheel 205, front right wheel 205, rear left wheel 205 or rear right wheel 205. Wheel slip state 470 can be received from a slip calibrator 415, which can be external to a PC 425 or implemented within, or as a part of, a PC 425.

Wheel slip target 475 can include any information or data for a wheel slip to be set or achieved for the wheel 205. Wheel slip target 475 can include a targeted value to be achieved by the slip control system 200 based on the wheel slip state 470. Wheel slip target 475 can include a slip target for any wheel 205, such as a front left wheel 205, front right wheel 205, rear left wheel 205 or rear right wheel 205.

Wheel torque state 480 can include any information or data for a current state of torque on a particular wheel 205. For example, wheel torque state 480 can include data, value or parameter indicating a current torque applied at any one of a front left wheel 205, front right wheel 205, rear left wheel 205 or rear right wheel 205. Wheel torque state 480 can be received from a slip comparator 420, which can be external to a PC 425 or implemented within, or as a part of, a PC 425.

Wheel torque target 485 can include any information or data for a wheel torque to be set or achieved for the wheel 205. Wheel torque target 485 can include a targeted value to be achieved by the slip control system 200 based on the wheel torque state 480. Wheel torque target 485 can include a torque target for any wheel 205, such as a front left wheel 205, front right wheel 205, rear left wheel 205 or rear right wheel 205.

For example, the present solution can utilize a predictive controller 425 that can implement a feedforward plus feedback (e.g., proportional integral controller) controller. The PC 425 can compute the wheel torque (e.g., wheel torque target 485) for each wheel 205 of the EV 102 using a feedforward plus feedback control mechanism, in which the feedback can include the current wheel slip state 470. The feedback controller of the PC 425 can be tuned using weights 455 to rely for torque distribution mostly on the actuator 210 that have faster response times. For instance, PC 425 can apply weights 455 so as to favor the fastest acting actuator 210 (e.g., motor 225 or brake 235). For instance, the actuator 210 with larger weight 455 can be a motor 225. In some implementations, the actuator 210 with larger weight 455 is the brake 235.

In some implementations, for each axle the PC 425 can have two wheel torque target values 485, one for a left wheel 205 and one for a right wheel 205. In the instances in which more than two wheels 205 are controlled, wheel torque target values 485 for additional wheels 205 can be computed. In the event of brake-based traction control, three actuators 210 can be used, such as a motor 225, a brake 235 for a left wheel 205 and a brake 235 for a right wheel 205. If the dynamics of the brake actuator and the motor actuator dynamics are the same, then one of multiple solutions can be selected.

In the implementations in which an actuator 210 that is a brake 235 has a slower response than an actuator 210 that is a motor 225, each actuator 210 can have different component limits, including for example different constraints 460 and different weights 455. In such implementations, a cost function can be used to assign a cost value on the slower or otherwise less preferred actuator 210 (e.g., brakes 235) rather than the more preferred actuator (e.g., motor 225) so as to select solutions that utilize and rely more on the preferred actuator 210. If the cost function is formulated as a quadratic function, then there is only one global minimum value can be found. The global minimum value can correspond to the optimal solution for selecting the target torque value. Finding the global min of a quadratic function given a set of linear constraints can include quadratic programming (QP) problem. By solving a QP, the PC 425 can identify the most optimal torque distribution between the actuators 210 (e.g., between the motor 225 and the brake 235) for each wheel 205.

In the present solution, the PC 425 can determine the total wheel torque target 485 which can be distributed between the motor 225 and brakes 235. The distribution between the actuators 210 can be achieved with torque targets 445 that can include portions of the wheel torque target 485 and which can be to be applied by different actuators 210 (e.g., motor 225 and brake 235) to the wheel 205 based on torque commands 450. The wheel torque target 485 can be applied to the wheel 205 in aggregate from the torque targets 445 by each of the actuators 210. The torque targets 445 for the actuators can be computed separately by the actuator torque model 430.

Actuator torque model 430 can include a distribution algorithm that can inherently account for the dynamics of both actuators 210 and their limitations (e.g. rate limit, magnitude limit, etc.). The actuator torque model 430 can achieve this by solving a set of equations that can include both the dynamic models (linearized model) of the actuators 210 and their limitations (e.g., constraints 460) in the form of linear inequalities. In the present solution, the PC 425 can account for the dynamics of the actuators 210 indirectly via gain tuning which can be implemented by utilizing weights 455 and constraints 460. For example, actuators 210 with slower response time can have smaller overall gains (e.g., lower weights 455) and vice versa actuators 210 that have faster response times can be weighted higher (e.g., higher weights 455).

For example, the DPS 400 can determine the torque targets 445 for the actuators 210 using a state-space system. The state space system can be implemented, for example, using the functions that can represent the state of the system and that can determine the next state of the system. For example, the present state of the system can include the present state of torque (e.g., 480) and the present state of slip (e.g., 470). For example, the next state of the system can include the next expected state, such as wheel torque target 485 and wheel slip target 475.

Based on the determination by the functions, the system can generate a torque command 450 (e.g., torque target 445), a torque command 450 (e.g., torque target 445) for a left brake 235, a torque command 450 (e.g., torque target 445) for a right brake 235, and torque states 440 for a left brake 235 and a right brake 235.

For example, PC 425 can use a cost function of the PC 425 to determine a minimal cost of distributing wheel torque target 485 across different actuators 210. For instance, one actuator 210, such as a motor 225, can have a preferred (e.g., faster) response time over another actuator 210, such as a brake 235. The cost function can account for the preferred response time by placing weights 455 for the actuators 210 so as to distribute torque across the actuators 210 such that motor 225 provides a larger portion of the total wheel torque target 485 than the brake 235. The torque targets 445 for the motor 225 and the brake 235 can be limited by the constraints 460. The cost function can be used by the PC 425 or actuator torque model 430 to determine torque targets 445 for each of the individual actuators 210, such that the cost is minimized while the wheel torque target 485 is achieved.

PC 425 can include and utilize a cost function to minimize the error between the wheel torque target 485 and the estimated wheel torque (e.g., wheel torque state 480) while using minimal effort by the actuators 210 (e . . . , minimize the usage of the actuators 210). The cost function of the PC 425 can use or consider outputs from the actuator torque model 430. The cost function can determine how outputs from the actuator torque model 430 contribute to the wheel torque state 480. The cost function can include, determine or consider the cost for any error (e.g., difference) between the wheel torque target 485 and the estimated wheel torque state 480. The cost can include, determine or consider the cost for using each of the individual actuators 210, whether motor 225 or brakes 235. The cost function can determine the minimal cost of using any combination or arrangement of the actuators 210 within the constraints. The cost function can therefore consider any constraints or limitations for each actuator 210, such as maximum allowable torque or maximum allowable change of the torque.

The cost function for which to find the global minimum in order to identify the optimal distribution of torque targets 445 for actuators 210 can identify the minimum of a quadratic equation for the cost function and identify the torque targets 445 for the actuators 210, based on the weights 455 and constraints 460 of the actuators 210.

In some aspects, the present disclosure relates to a data processing system 400 for controlling the slip of one or more wheels 205 by distributing torque across multiple actuators 210 in accordance with a predictive control model. Data processing system 400 can use a slip calibrator 415 to identify, via a sensor 230 of a vehicle 105, a wheel slip state 470 for a wheel 205 of the vehicle 105. The wheel slip state 470 can be identified based on a difference between a motion of the wheel motion data 405 and a motion of the vehicle (e.g., vehicle motion data 410). DPS 400 can determine an amount of wheel torque target 485 to apply to the wheel 205 in order to adjust the wheel slip state 470 to satisfy the wheel slip target 475. For example, the wheel torque target 485 for the wheel 205 can correspond to the next setting for the torque for the wheel 205 which can be determined such that it matches the current wheel slip state 470 with the wheel slip target 475. For example, the wheel slip state 470 can correspond to an amount of slip that is higher than the wheel slip target 470 The wheel torque target 485 can be determined to bring the wheel slip state 470 within a range of the wheel slip target 470, such as for example, below the wheel slip target 475 amount.

The slip comparator 420 can determine the amount of wheel torque target 485 based on a comparison between the wheel slip state 470 and a wheel slip target 475 for the wheel 205. The slip comparator 420 can distribute a first portion of the amount of torque (e.g., a first torque target 445) to apply to the wheel 205 via a first actuator (e.g., motor 225) of the plurality of actuators 210. DPS 400, or a component of the DPS 400, can distribute a second portion of the amount of torque (e.g., a second torque target 445) to apply to the wheel 205 via a second actuator (e.g., brake 235) of the plurality of actuators 210. DPS 400, or a component of the DPS 400, can provide one or more torque commands 450 to cause the first actuator 210 (e.g., motor 225) to apply the first torque target 445, which can correspond to the first part of the amount of the wheel torque target 485. DPS 400, or a component of the DPS 400, can provide one or more torque commands 450 and cause the second actuator 210 (e.g., brake 235) to apply the second torque target 445, corresponding to the second part of the amount of the wheel torque target 485, to adjust the slip (e.g., wheel slip state 470) of the wheel 205. For example, the first torque target 445 for a first actuator 210 (e.g., motor 225) and the second torque target 445 for a second actuator 210 (e.g., brake 235) can amount to the total wheel torque target 485 for the wheel 205. The slip control system 200 can therefore distribute the wheel torque target 485 across the actuators 210 (e.g., motor 225 and brake 235) to provide the wheel torque target 485 to the wheel 205.

DPS 400 can include the plurality of actuators 210 that can include comprises a third actuator, such as another brake 235 for a second wheel 205. DPS 400 can determine, based on a comparison between a wheel slip state 470 of a second wheel 205 of the vehicle 105 and a wheel slip target 475 set for the second wheel 205, a second amount of torque (e.g., wheel torque target 485) to apply to the second wheel 205. DPS 400 can determine a first portion of the second amount of torque (e.g., a third torque target 445) to apply to the second wheel 205 via the third actuator (e.g., the brake 235 of the second wheel 205). DPS 400 can make this determination based at least in part on an actuator torque model 430 establishing constraints 460 and weights 455 for the plurality of actuators 210 and the amount of torque to apply to the wheel (e.g., wheel torque state 480 for the first wheel 205). DPS 400 can provide a command (e.g., torque command 450) to cause the third actuator (e.g., the brake 235 of the second wheel 205) to apply the first portion (e.g., third torque target 445) of the second amount of torque (e.g., wheel torque target 485 of the second wheel) to the second wheel 205.

DPS 400 can determine, based on a comparison between a wheel slip state 470 of a second wheel 205 of the vehicle 105 and a wheel slip target 475 set for the second wheel 205, a second amount of wheel torque target 485 to apply to the second wheel 205. For example, DPS 400 can determine, based at least in part on the first portion (e.g., torque target 445) of the amount of torque (e.g., wheel torque target 485) applied to the wheel 205 by the first actuator (e.g., motor 225), a first portion (e.g., torque target 445) of the second amount wheel torque target 485 to apply to the second wheel 205 via a third actuator (e.g., a second brake 235) of the plurality of actuators 210. DPS 400 can provide a torque command 450 to cause the third actuator (e.g., the second brake 235) to apply the first portion (e.g., torque target 445) of the second amount wheel torque target 485 to the second wheel 205. The second actuator 210 (e.g., a brake 235) can be a same type of actuator (e.g., a brake 235) as the third actuator 210 and the first actuator (e.g., motor 225) can be a different type of actuator 210 than the second actuator (e.g., a brake 235).

DPS 400 can include an actuator torque model 430. The actuator torque model 430 can be configured with a function (e.g., a cost function, optimization function, or loss function). The function can be tuned with constraints 460 and weights 455 for the plurality of actuators 210. The cost function can be used to distribute application of torque for one or more wheels 205 (e.g., one or more wheel torque targets 485) among the plurality of wheels 205 of the vehicle 105. DPS 400, or a component of the DPS 400, can determine, via the actuator torque model 430, the first portion (e.g., first torque target 445) of the amount of torque (e.g., one or more wheel torque targets 485) to apply to the wheel 205 via the first actuator 210 (e.g., motor 225). DPS 400 can determine, via the actuator torque model 430, the second portion (e.g., second torque target 445) of the amount of torque (e.g., one or more wheel torque targets 485) to apply to the wheel 205 via the second actuator 210.

DPS 400 can include an actuator torque model 430 that is configured with linear dynamics of the plurality of actuators 210. For example, each actuator 210 can have its torque target 445 for the torque command 450 determined based on a linear function. For example, a torque target 445 for an actuator 210 can be determined using a linear function that includes a weight 455 as a multiplier for the value of the torque to be assigned or distributed to the actuator 210. DPS 400 can determine, via the actuator torque model 430 configured with linear dynamics, the first portion (e.g., first torque target 445) of the amount of torque (e.g., wheel torque target 485) to apply to the wheel 205 via the first actuator 210. DPS 400 can determine via the actuator torque model 430 configured with linear dynamics, the second portion (e.g., second torque target 445) of the amount of torque to apply to the wheel 205 via the second actuator 210.

DPS 400 can include an actuator torque model 430 that is configured with a quadratic function that can determine a global minimum value for a wheel slip target 475. The quadratic function can determine the global minimum based on constraints 460 or weights 455 for each of the plurality of actuators 210. DPS 400 can determine, via the actuator torque model configured with a quadratic function, a global minimum value. The global minimum value can be indicative of the first portion of the amount of torque to apply to the wheel via the first actuator and the second portion of the amount of torque to apply to the wheel via the second actuator.

DPS 400 can include an actuator torque model 430 that uses weights 455 and constraints 460 for the actuators 210 to determine torque targets 445 for the actuators 210. For example, the data processing system 400 can distribute the first portion (e.g., torque target 445) of the amount of torque (e.g., wheel torque target 485) based at least in part on an actuator torque model 430 established with constraints 460 and weights 455 for a plurality of actuators 210 of the vehicle 105. Actuator torque model 430 can include a first constraint 460 and a first weight 455 for the first actuator 210 (e.g., motor 225) that is different than a second constraint 460 and a second weight 455 for the second actuator 210 (e.g., brake 235). The first actuator 210 can include a motor 225 that rotates the wheel 205 of the vehicle 105 and the second actuator can include a brake 235 for the wheel 205. The first weight 455 for the motor 225 can be greater than the second weight 455 for the brake 235. In some implementations, the first weight 455 can be for the brake 235 and the second weight 455 can be for the motor 225. In some implementations, the first weight for the brake 235 can be greater than the second weight 455 for the motor 225.

DPS 400 can determine, via the actuator torque model 430, that the first portion (e.g., torque target 445) of the wheel torque target 485 to apply via the first actuator (e.g., motor 225) is greater than the second portion (e.g., torque target 445) of the amount of torque to apply via the second actuator (e.g., brake 235). The first actuator 210 can include a motor 225 that controls rotation of the wheel 205 of the vehicle, the second actuator 210 can include a brake pad 235 to inhibit rotation of the wheel 205. A first weight 455 for the first actuator 210 can be greater than the second weight 455 for the second actuator.

DPS 400 can determine, via the actuator torque model 430, the first portion (e.g., torque target 445) of the amount of torque for a first actuator 210 equals the wheel torque target 485, and the second portion (e.g., torque target 445) of the amount of torque for a second actuator 210 is zero. The data processing system 400 can determine to apply no torque (or zero torque) via the second actuator 210, and instead apply the total amount of torque via the first actuator 210, based on the global minimum identified via the cost function and quadratic programming technique. For example, the first actuator 210 can include an electric motor 225 and the second actuator 210 can include a brake pad 235. For example, the second actuator 210 can include an electric motor 225 and the first actuator 210 can include a brake pad 235.

DPS 400 can distribute the first portion (e.g., torque target 445) of the amount of torque (e.g., wheel torque target 485) based at least in part on an actuator torque model 430 that can be established with constraints 460 and weights 455 for a plurality of actuators 210 of the vehicle 105. The constraints 460 can correspond to a rate of actuation of the plurality of actuators 210, and the weights 455 can correspond to a cost associated with use of the plurality of actuators 210.

In some implementations, the present disclosure relates to an electric vehicle, such as an EV 105. EV 105 can include a plurality of wheels 205, an electric motor 225 to control rotation of a wheel 205 of the plurality of wheels 205 and a brake 235 to inhibit rotation of the wheel 205. EV 105 can include a first sensor 230 of a plurality of sensors 230 to detect motion of the wheel 205, and a second sensor 230 of the plurality of sensors 230 to detect motion of the EV 105. The EV 105 can include a DPS 400 that can include, or execute on, one or more processors 310 that can be coupled with memory (e.g., main memory 315, ROM 320 or storage device 325).

DPS 400 can identify, via the plurality of sensors 230, a wheel slip state 470 for the wheel 205 based on a difference between the motion of the wheel (e.g., wheel motion data 405) and the motion of the electric vehicle (e.g., vehicle motion data 410). DPS 400 can determine, based on a comparison between the wheel slip state 470 and a wheel slip target 475 for the wheel 205, an amount of torque (e.g., wheel torque target 485) to apply to the wheel 205 to adjust the slip (e.g., wheel slip state 470) of the wheel 205 satisfy the wheel slip target 475. DPS 400 can distribute, based at least in part on an actuator torque model 430 established with constraints 460 and weights 455 for the electric motor 225 and the brake 235, a first portion (e.g., torque target 445) of the amount of the wheel torque target 485 to apply to the wheel 205 via the electric motor 225 and a second portion (e.g., torque target 445) of the wheel torque target 485 to apply to the wheel 205 via the brake 235. The actuator torque model 430 can include a first constraint 460 and a first weight 455 for the electric motor 225 that is different than a second constraint 460 and a second weight 455 for the brake 235. DPS 400 can provide one or more torque commands 450 to cause the electric motor 225 to apply the first portion (e.g., torque target 445) of the amount of torque (e.g., wheel torque target 485). DPS 400 can provide one or more torque commands 450 to cause the brake 235 to apply the second portion (e.g., torque target 445) of the amount of torque (e.g., wheel torque target 485) to adjust the wheel slip state 470 of the wheel 205.

The DPS 400 of the EV 105 can include an actuator torque model 430 that is configured with a quadratic function based on the constraints 460 and the weights 455 of the electric motor 225 and the brake 235 for each wheel 205. The DPS 400 can determine, via the actuator torque model 430, a global minimum value indicative of the first portion (e.g., torque target 445) of the amount of torque (e.g., wheel torque target 485) to apply to the wheel 205 via the electric motor 225 and the second portion (e.g., torque target 445) of the wheel torque target 485 to apply to the wheel 205 via the brake 235.

Figure 5:
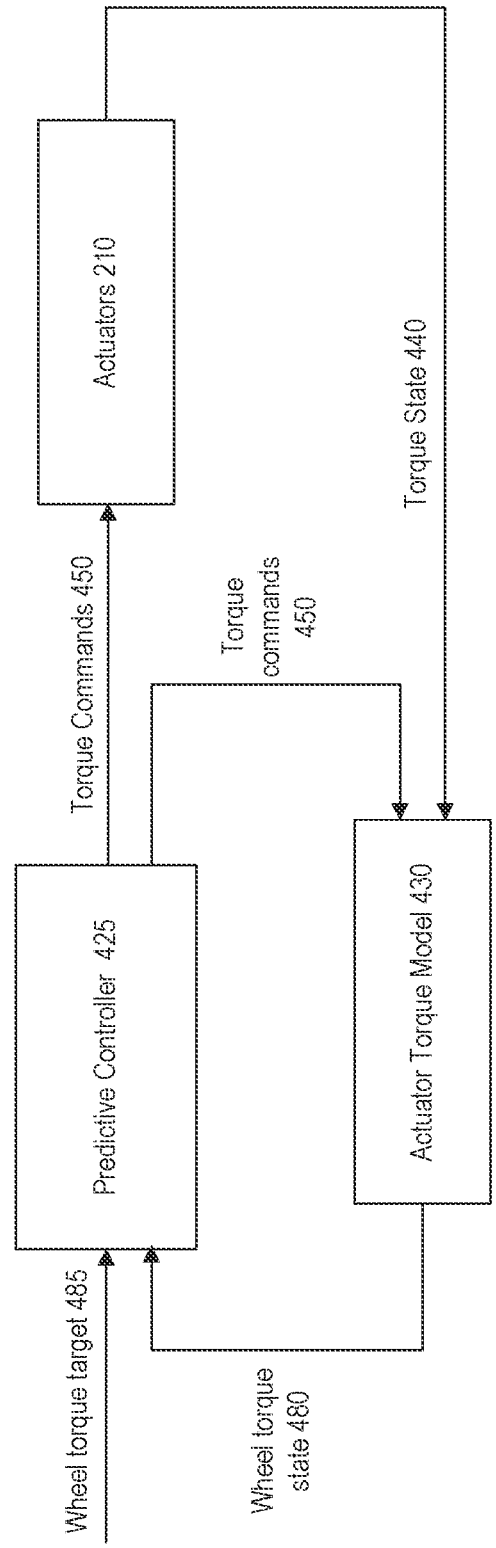
FIG. 5 is an example diagram for implementing a slip control using the torque controller and the actuator torque model.

FIG. 5 depicts an example operations performed by the DPS 400 of the slip control system 200 during the implementation of the predictive control modeling in accordance with the present solution. FIG. 5 shows a predictive controller 425 that can receive a wheel torque target 485 for a wheel 205. The wheel torque target 485 can be received, for example, from a slip comparator 420. The slip comparator 420 can be internal or external to the predictive controller 425. Slip comparator 420 can determine the wheel torque target 485 based on a comparison of a current wheel slip state 470 and a wheel slip target 475. Predictive controller 425 can receive estimated wheel torque state 480 from the actuator torque model 430.

Predictive controller 425 can use the received information to process the data and generate torque commands 450 for the actuators 210. Predictive controller 425 can utilize the actuator torque model 430 to process the data and make determinations. For example, based on the wheel torque target 485 or the wheel torque state 480, the predictive controller 425 can use the actuator torque model 430 to determine one or more wheel torque states 480 for one or more wheels 205 or torque targets 445 for one or more actuators 210, such as the motor 225 and brakes 235 of one or more wheels 205 of an EV 105. The predictive controller 425 can issue torque commands 450 based on, or using, the torque targets 445. Predictive controller 425 can send the torque commands 450 to the actuators 210.

Actuators 210 can receive the torque commands 450 and apply the torque targets 445 based on the torque commands 450 on the wheels 205. For example, a motor 225 can receive a command 450 to implement a torque target 445 on a wheel 205. The motor 225 can apply the torque in accordance with the torque target 445 on the wheel 205. For example, a brake 235 can receive a command 450 to implement a torque target 445 on a wheel 205. The brake 235 can apply the torque in accordance with the torque target 445 on the wheel 205.

Actuators 210 can send torque states 440 to the actuator torque model 430. Torque states 440 can include feedback as to the state of the actuators 210. Torque states 440 can include information on the current state of torque applied by each of the actuators 210. For example, torque states 440 can include information from sensors 230 of the motor 225 or brakes 235.

Actuator torque model 430 can use the torque commands 450 or torque states 440 to determine the current state of the wheels 205 (e.g., wheel torque state 480). Actuator torque model 430 can determine the estimate of a current state of torque on the wheel (e.g., wheel torque state 480). In some implementations, actuator torque model 430 can determine a wheel torque target 485 and the actuator torque targets 445 for the actuators 210 (e.g., motors 225 and brakes 235). Actuator torque model 430 can send its output to the predictive controller 425. For example, actuator torque model 430 can send the wheel torque state 480 to the PC 425. For example, actuator torque model 430 can send the wheel torque target 485 and the actuator torque targets 445 to the predictive controller 425. The predictive controller

425 can then use this information to make the next set of determinations and send out the next set of torque commands 450.

Figure 6:
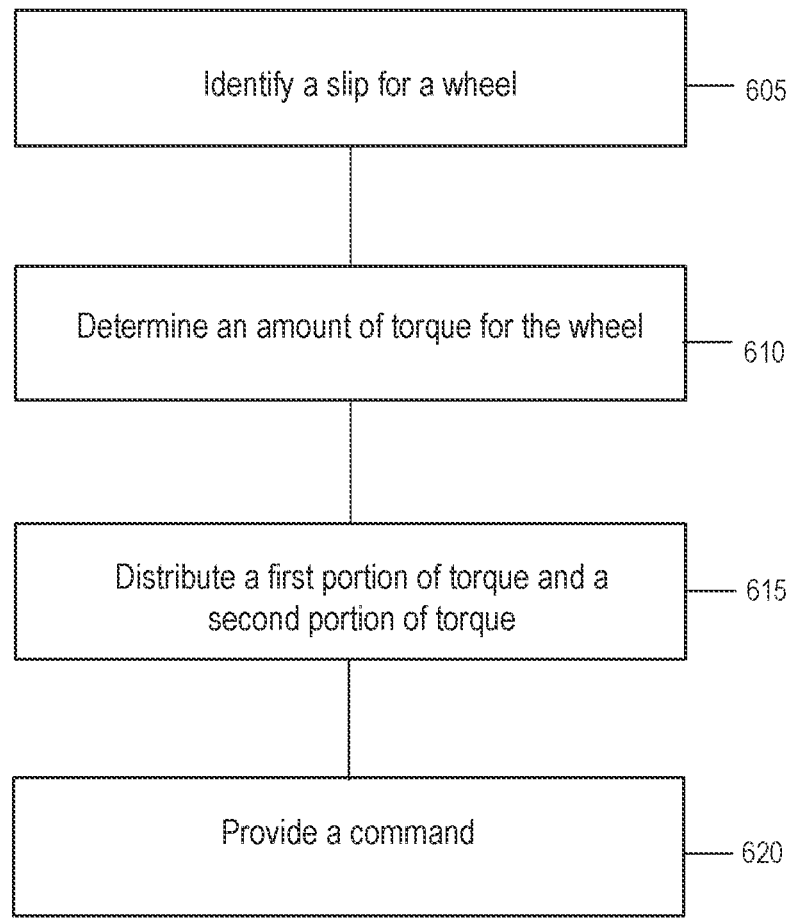
FIG. 6 is a flow diagram of an example method for implementing a slip control using the system features described in FIGS. 1-5.

FIG. 6 illustrates a method 600 that utilizes the slip control system determine and distribute torque targets to be applied by actuators in order to control the slip of the wheels of a vehicle. Method 600 can include ACTS 605-620. At ACT 605, the method identifies a slip for a wheel. At ACT 610, the method determines an amount of torque for the wheel. At ACT 615, the method distributes a first portion of torque and a second portion of torque. At ACT 620, the method provides a command.

At ACT 605, the data processing system can identify a slip for a wheel. Data processing system can identify, via a sensor, a slip for a wheel of the vehicle based on a difference between a motion of the wheel and a motion of the vehicle. The slip calibrator of the data processing system can determine the slip for each wheel of the vehicle. For example, the slip calibrator can monitor wheel motion data and the vehicle motion data. The slip calibrator can determine a difference between the wheel motion and the vehicle motion. The difference can correspond to the slip of the wheel with respect to the terrain on which the vehicle is moving.

At ACT 610, the method determines an amount of torque. Data processing system can determine, based on a comparison between the slip and a slip target for the wheel, an amount of torque to apply to the wheel to adjust the slip of the wheel to satisfy the slip target. The data processing system can determine based on a comparison between a slip of a second wheel of the vehicle and a slip target set for the second wheel, a second amount of torque to apply to the second wheel. For example, the data processing system can determine a wheel slip target for all wheels of a vehicle. Each wheel slip target can be determined based on a comparison between a current slip state of that wheel and a slip target for that wheel.

At ACT 615, the method distributes a first portion of torque and the second portion of torque. Data processing system can distribute a first portion of the amount of torque to apply to the wheel via a first actuator of the plurality of actuators and a second portion of the amount of torque to apply to the wheel via a second actuator of the plurality of actuators. The first portion of the amount of torque and the second portion of the amount of torque can be determined by the data processing system based at least in part on a model established with constraints and weights for a plurality of actuators of the vehicle. The model can include a first constraint and a first weight for the first actuator that is different than a second constraint and a second weight for the second actuator. The first and the second actuators can be of the same or a different type. For example, the first actuator can include a motor that rotates the wheel of the vehicle. For example, the second actuator comprises a brake for the wheel. For example, the first weight for the first actuator is greater than the second weight for the second actuator. For example, the second weight is greater than the first weight.

Data processing system can determine, based at least in part on the model and the amount of torque to apply to the wheel, a first portion of the second amount of torque to apply to the second wheel via the third actuator. For example, a second wheel can include an actuator, such as a brake, the first portion of the second amount of torque can be determined to apply to the second wheel via the brake of the second one. Data processing system can determine, based on a comparison between a slip of a second wheel of the vehicle and a slip target set for the second wheel, a second amount of torque to apply to the second wheel. For example, a slip comparator of the data processing system can determine the second amount of torque for the second wheel based on the comparison of the slip of the second wheel and the slip target for the second wheel.

Data processing system can determine, based at least in part on the first portion of the amount of torque applied to the wheel by the first actuator, a first portion of the second amount of torque to apply to the second wheel via a third actuator of the plurality of actuators. For example, the data processing system can take into account the first portion of the amount of torque applied to a first wheel when determining the second amount of torque for the second wheel. For example, the data processing system can determine the second amount of torque to apply to the second wheel based on the first amount of torque applied to the first wheel.

Data processing system can use an actuator torque model that is configured with a cost function tuned with the constraints and the weights for the plurality of actuators to distribute application of torque among a plurality of wheels of the vehicle. Data processing system can determine, based on the model, the first portion of the amount of torque to apply to the wheel via the first actuator and the second portion of the amount of torque to apply to the wheel via the second actuator.

Data processing system can determine, via the model configured with linear dynamics of the plurality of actuators, the first portion of the amount of torque to apply to the wheel via the first actuator and the second portion of the amount of torque to apply to the wheel via the second actuator. For example, the model can use linear dynamics for a motor and for a brake of a wheel. The model can use linear dynamics to determine the first portion of the amount of torque and the second portion of the amount of torque.

Data processing system can use a model that is configured with a quadratic function and that is based on the constraints and the weights of the plurality of actuators. Data processing system can determine, via the model configured with a quadratic function, a global minimum value. The global minimum value can correspond to a minimal value of a cost for distributing torque targets for the actuators of a wheel based on the constraints and weights of each of the actuators for the wheel. The global minimum value can correspond to a minimal amount of slip for the wheel to be established by the actuators 210 based on the weights 455 and constraints 460. The global minimum value can correspond to or be indicative of the first portion of the amount of torque to apply to the wheel via the first actuator and the second portion of the amount of torque to apply to the wheel via the second actuator. The global minimum value can correspond to the torque target amounts for the actuators based on the constraints and weights and based on the cost function.

Data processing system can determine, via the model, the first portion of the amount of torque to apply via the first actuator is greater than the second portion of the amount of torque to apply via the second actuator. The first actuator can include a motor that controls rotation of the wheel of the vehicle. The second actuator can include a brake pad to inhibit rotation of the wheel. The first weight for the first actuator can be greater than the second weight for the second actuator. For example, the first weight for the first actuator can be less than the second weight for the second actuator. For example, the first weight and the second weight can be equal.

At ACT 620, the method provides a command. Data processing system can provide one or more commands to cause the first actuator to apply the first portion of the amount of torque and cause the second actuator to apply the second portion of the amount of torque to adjust the slip of the wheel. For example, the data processing system can provide a command to cause a first actuator (e.g., a motor) to apply a torque target determined for the first actuator to a wheel. For example, the data processing system can provide a command to cause a second actuator (e.g., a brake) to apply a torque target determined for the second actuator to the wheel.

The data processing system can issue a command to cause the third actuator to apply the first portion of the second amount of torque to the second wheel. The method can include providing, by the data processing system, a command to cause the third actuator to apply the first portion of the second amount of torque to the second wheel. The second actuator (e.g., a brake) can be a same type of actuator as the third actuator (e.g., a brake) and the first actuator (e.g., a motor) can be a different type of actuator than the second actuator (e.g., a brake).

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, actuators 210 that are preferred or have higher and lower response times, can be swapped and weights 455 for motor 225 and brakes 235 can be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   one or more processors coupled with memory to:
   identify, via a sensor of a vehicle, a slip for a wheel of the vehicle based on a difference between a motion of the wheel and a motion of the vehicle;
   determine, based on a comparison between the slip and a slip target for the wheel, an amount of torque to apply to the wheel to adjust the slip of the wheel to satisfy the slip target;
   distribute a first portion of the amount of torque to apply to the wheel via a first actuator of a plurality of actuators of the vehicle, and a second portion of the amount of torque to apply to the wheel via a second actuator of the plurality of actuators;

provide one or more commands to cause the first actuator to apply the first portion of the amount of torque and cause the second actuator to apply the second portion of the amount of torque to adjust the slip of the wheel;

determine, based at least in part on the one or more commands and information from at least one of the first actuator or the second actuator input into a model, a state of torque of the wheel; and adjust, based on the state of torque of the wheel, the one or more commands for the first actuator and the second actuator.

2. The system of claim 1, wherein the plurality of actuators comprises a third actuator, and the system comprises the one or more processors to:

determine, based on a comparison between a slip of a second wheel of the vehicle and a slip target set for the second wheel, a second amount of torque to apply to the second wheel;

determine, based at least in part on the model establishing constraints and weights for the plurality of actuators and the amount of torque to apply to the wheel, a first portion of the second amount of torque to apply to the second wheel via the third actuator; and provide a command to cause the third actuator to apply the first portion of the second amount of torque to the second wheel.

3. The system of claim 1, comprising the one or more processors to:

determine, based on a comparison between a slip of a second wheel of the vehicle and a slip target set for the second wheel, a second amount of torque to apply to the second wheel;

determine, based at least in part on the first portion of the amount of torque applied to the wheel by the first actuator, a first portion of the second amount of torque to apply to the second wheel via a third actuator of the plurality of actuators; and provide a command to cause the third actuator to apply the first portion of the second amount of torque to the second wheel, wherein the second actuator is a same type of actuator as the third actuator and the first actuator is a different type of actuator than the second actuator.

4. The system of claim 1, comprising:

the one or more processors to determine, via the model configured with a cost function tuned with constraints and weights for the plurality of actuators to distribute application of torque among a plurality of wheels of the vehicle, the first portion of the amount of torque to apply to the wheel via the first actuator and the second portion of the amount of torque to apply to the wheel via the second actuator.

5. The system of claim 1, comprising:

the one or more processors to determine, via the model configured with linear dynamics of the plurality of actuators, the first portion of the amount of torque to apply to the wheel via the first actuator and the second portion of the amount of torque to apply to the wheel via the second actuator.

6. The system of claim 1, comprising the one or more processors to:

determine, via the model configured with a quadratic function based on constraints and weights of the plurality of actuators, a global minimum value indicative of the first portion of the amount of torque to apply to the wheel via the first actuator and the second portion of the amount of torque to apply to the wheel via the second actuator.

7. The system of claim 1, comprising the one or more processors to:

distribute the first portion of the amount of torque based at least in part on the model established with constraints and weights for the plurality of actuators of the vehicle, wherein the model comprises a first constraint and a first weight for the first actuator that is different than a second constraint and a second weight for the second actuator, and wherein the first actuator comprises a motor that rotates the wheel of the vehicle, the second actuator comprises a brake for the wheel, and the first weight is greater than the second weight.

8. The system of claim 1, comprising:

the one or more processors to determine, via the model, the first portion of the amount of torque to apply via the first actuator is greater than the second portion of the amount of torque to apply via the second actuator, wherein the first actuator comprises a motor that controls rotation of the wheel of the vehicle, the second actuator comprises a brake pad to inhibit rotation of the wheel, and a first weight for the first actuator is greater than a second weight for the second actuator.

9. The system of claim 1, comprising:

the one or more processors to determine, via the model, the first portion of the amount of torque equals the amount of torque, and the second portion of the amount of torque is zero, wherein the first actuator comprises an electric motor and the second actuator comprises a brake pad.

10. The system of claim 1, comprising:

the one or more processors to distribute the first portion of the amount of torque based at least in part on the model established with one or more constraints and one or more weights for the plurality of actuators of the vehicle, wherein the one or more constraints correspond to a rate of actuation of the plurality of actuators, and the one or more weights correspond to a cost associated with use of the plurality of actuators.

11. A method, comprising:

identifying, by a data processing system of a vehicle comprising one or more processors and memory, via a sensor, a slip for a wheel of the vehicle based on a difference between a motion of the wheel and a motion of the vehicle;

determining, by the data processing system based on a comparison between the slip and a slip target for the wheel, an amount of torque to apply to the wheel to adjust the slip of the wheel to satisfy the slip target;

distributing, by the data processing system based at least in part on a model established with constraints and weights for a plurality of actuators of the vehicle, a first portion of the amount of torque to apply to the wheel via a first actuator of the plurality of actuators, and a second portion of the amount of torque to apply to the wheel via a second actuator of the plurality of actuators, wherein the model comprises a first constraint and a first weight for the first actuator that is different than a second constraint and a second weight for the second actuator;

providing, by the data processing system, one or more commands to cause the first actuator to apply the first portion of the amount of torque and cause the second actuator to apply the second portion of the amount of torque to adjust the slip of the wheel;

determining, by the data processing system, based at least in part on the one or more commands and information from at least one of the first actuator or the second actuator input into the model, a state of torque of the wheel; and adjusting, by the data processing system, based on the state of torque of the wheel, the one or more commands for the first actuator and the second actuator.

12. The method of claim 11, wherein the plurality of actuators comprises a third actuator, comprising:

determining, by the data processing system, based on a comparison between a slip of a second wheel of the vehicle and a slip target set for the second wheel, a second amount of torque to apply to the second wheel;

determining, by the data processing system based at least in part on the model and the amount of torque to apply to the wheel, a first portion of the second amount of torque to apply to the second wheel via the third actuator; and providing, by the data processing system, a command to cause the third actuator to apply the first portion of the second amount of torque to the second wheel.

13. The method of claim 11, comprising:

determining, by the data processing system based on a comparison between a slip of a second wheel of the vehicle and a slip target set for the second wheel, a second amount of torque to apply to the second wheel;

determining, by the data processing system based at least in part on the first portion of the amount of torque applied to the wheel by the first actuator, a first portion of the second amount of torque to apply to the second wheel via a third actuator of the plurality of actuators; and providing, by the data processing system, a command to cause the third actuator to apply the first portion of the second amount of torque to the second wheel, wherein the second actuator is a same type of actuator as the third actuator and the first actuator is a different type of actuator than the second actuator.

14. The method of claim 11, comprising:

determining, by the data processing system via the model configured with a cost function tuned with the constraints and the weights for the plurality of actuators to distribute application of torque among a plurality of wheels of the vehicle, the first portion of the amount of torque to apply to the wheel via the first actuator and the second portion of the amount of torque to apply to the wheel via the second actuator.

15. The method of claim 11, comprising:

determining, by the data processing system via the model configured with linear dynamics of the plurality of actuators, the first portion of the amount of torque to apply to the wheel via the first actuator and the second portion of the amount of torque to apply to the wheel via the second actuator.

16. The method of claim 11, comprising:

determining, by the data processing system via the model configured with a quadratic function based on the constraints and the weights of the plurality of actuators, a global minimum value indicative of the first portion of the amount of torque to apply to the wheel via the first actuator and the second portion of the amount of torque to apply to the wheel via the second actuator.

17. The method of claim 11, wherein the first actuator comprises a motor that rotates the wheel of the vehicle, the second actuator comprises a brake for the wheel, and the first weight is greater than the second weight.

18. The method of claim 11, comprising:

determining, by the data processing system via the model, the first portion of the amount of torque to apply via the first actuator is greater than the second portion of the amount of torque to apply via the second actuator, wherein the first actuator comprises a motor that controls rotation of the wheel of the vehicle, the second actuator comprises a brake pad to inhibit rotation of the wheel, and the first weight is greater than the second weight.

19. An electric vehicle, comprising:

a plurality of wheels;

an electric motor to control rotation of a wheel of the plurality of wheels;

a brake to inhibit rotation of the wheel;

a first sensor of a plurality of sensors to detect motion of the wheel;

a second sensor of the plurality of sensors to detect motion of the electric vehicle; and a data processing system comprising one or more processors coupled with memory to:

identify, via the plurality of sensors, a slip for the wheel based on a difference between the motion of the wheel and the motion of the electric vehicle;

determine, based on a comparison between the slip and a slip target for the wheel, an amount of torque to apply to the wheel to adjust the slip of the wheel to satisfy the slip target;

distribute, based at least in part on a model established with constraints and weights for the electric motor and the brake, a first portion of the amount of torque to apply to the wheel via the electric motor, and a second portion of the amount of torque to apply to the wheel via the brake, wherein the model comprises a first constraint and a first weight for the electric motor that is different than a second constraint and a second weight for the brake;

provide one or more commands to cause the electric motor to apply the first portion of the amount of torque and cause the brake to apply the second portion of the amount of torque to adjust the slip of the wheel;

determine, based at least in part on the one or more commands and information from at least one of a first actuator or a second actuator of a plurality of actuators of the electric vehicle input into the model, a state of torque of the wheel; and adjust, based on the state of torque of the wheel, the one or more commands for the first actuator and the second actuator.

20. The electric vehicle of claim 19, comprising:

the data processing system to determine, via the model configured with a quadratic function based on the constraints and the weights of the electric motor and the brake, a global minimum value indicative of the first portion of the amount of torque to apply to the wheel via the electric motor and the second portion of the amount of torque to apply to the wheel via the brake.

* * * * *